United States Patent
Tu et al.

(10) Patent No.: US 9,584,324 B2
(45) Date of Patent: Feb. 28, 2017

(54) CENTRALIZED DATASTORE PASSWORD MANAGEMENT

(71) Applicants: Enping Tu, Cupertino, CA (US); Yung-Yin Chen, Cupertino, CA (US); Ning Li, Saratoga, CA (US)

(72) Inventors: Enping Tu, Cupertino, CA (US); Yung-Yin Chen, Cupertino, CA (US); Ning Li, Saratoga, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/153,400

(22) Filed: Jan. 13, 2014

(65) Prior Publication Data

US 2015/0200781 A1    Jul. 16, 2015

(51) Int. Cl.
*H04L 29/06*     (2006.01)
*H04L 9/32*      (2006.01)
*G06F 21/45*     (2013.01)

(52) U.S. Cl.
CPC ............ *H04L 9/3226* (2013.01); *G06F 21/45* (2013.01); *H04L 63/083* (2013.01)

(58) Field of Classification Search
CPC ....... H04L 9/3236; H04L 63/04; H04L 63/08; H04L 9/3226; H04L 63/0428; H04L 9/321; H04L 9/3297; H04L 2209/80; H04L 63/0807; H04L 63/083; H04L 29/06; H04L 63/068; H04L 63/0815; H04L 63/0846; H04L 63/1425; H04L 9/0822; G06F 17/30029; G06F 17/30041; G06F 21/45; G06F 17/30318; G06F 17/30595; G06F 17/30731; G06F 17/30958; G06F 21/6227

USPC ........................................................ 713/155
See application file for complete search history.

(56) References Cited

U.S. PATENT DOCUMENTS

| | | |
|---|---|---|
| 5,351,295 A | 9/1994 | Perlman et al. |
| 7,434,062 B2 | 10/2008 | Erez |
| 8,010,782 B2 | 8/2011 | Kerschbaum |
| 8,024,369 B2 | 9/2011 | Pellegrini et al. |
| 2003/0046593 A1* | 3/2003 | Xie .......................... G06F 21/80 726/33 |
| 2004/0103288 A1* | 5/2004 | Ziv ...................... G06F 12/1466 713/185 |
| 2005/0120203 A1 | 6/2005 | Yeh et al. |
| 2006/0053112 A1 | 3/2006 | Chitkara et al. |
| 2006/0168253 A1* | 7/2006 | Baba ..................... H04L 9/3271 709/229 |
| 2007/0136324 A1 | 6/2007 | Xu et al. |
| 2007/0255741 A1 | 11/2007 | Geiger et al. |
| 2010/0037161 A1 | 2/2010 | Stading et al. |

(Continued)

*Primary Examiner* — William Powers
*Assistant Examiner* — Abiy Getachew
(74) *Attorney, Agent, or Firm* — Buckley, Maschoff & Talwalkar LLC

(57) ABSTRACT

According to some embodiments, an application server may have a repository to facilitate a transfer of data between data storage elements. A datastore may be stored in the repository for a data storage element, the datastore including a password reference identifier. A password center table may be created in the repository to associate the password reference identifier with an actual encrypted password for the data storage element. At execution time, the password reference identifier in the datastore may be automatically replaced with the actual encrypted password for the data storage element.

16 Claims, 6 Drawing Sheets

(56) References Cited

U.S. PATENT DOCUMENTS

| | | | |
|---|---|---|---|
| 2010/0058067 A1* | 3/2010 | Schneider | H04L 9/0866 713/184 |
| 2010/0275149 A1* | 10/2010 | Vuong | G06F 17/212 715/780 |
| 2011/0119487 A1 | 5/2011 | Alexander et al. | |
| 2012/0158821 A1 | 6/2012 | Barros | |
| 2013/0046812 A1 | 2/2013 | Niemoeller et al. | |
| 2013/0191185 A1 | 7/2013 | Galvin | |
| 2013/0196627 A1 | 8/2013 | Ng et al. | |
| 2013/0326346 A1 | 12/2013 | Zhu et al. | |

* cited by examiner

500 ↘

| DATASTORE ID 502 | REFERENCE ID 504 | ENCRYPTED PASSWORD 506 | DECRYPTION KEY LINK 508 |
|---|---|---|---|
| DS_101 | RID_101 | HSADHIAISASHD | POINTER 1 |
| DS_102 | RID_102 | FI8OSUOSPOHS | POINTER 2 |
| ⋮ | | | |
| DS_10X | RID_10X | JK042FSD7T78F | POINTER X |

FIG. 5

CENTRALIZED DATASTORE PASSWORD MANAGEMENT

FIELD

Some embodiments relate to database systems. In particular, some embodiments are associated with centralized datastore password management.

BACKGROUND

An application server may facilitate transfers of data associated with data storage elements. For example, an Extract, Transform, Load ("ETL") tool may move data between data storage elements, including databases, web services, plain files, etc. The application server may store encrypted passwords for the data storage elements to allow access to the data sources at run time. In particular, the passwords may be stored at the application server in datastores associated with the data storage elements. Note, however, that different datastores may store the encrypted passwords in different ways. For example, one datastore might be associated with a database and save a password as a property of a datastore object while another datastore saves a password as an element of a property of the datastore object. Further note that, for security reasons, passwords and/or encryption keys may be changed (e.g., on a periodic basis or as a result of a customer request). It can be difficult, however, to automatically update the password information in the various datastores in an efficient and accurate manner. It may therefore be desirable to provide automated and efficient systems and methods to manage passwords and keys at an application server.

BRIEF DESCRIPTION OF THE DRAWINGS

FIG. 5 is a portion of a tabular password center table in accordance with some embodiments.

DETAILED DESCRIPTION

Figure 1:
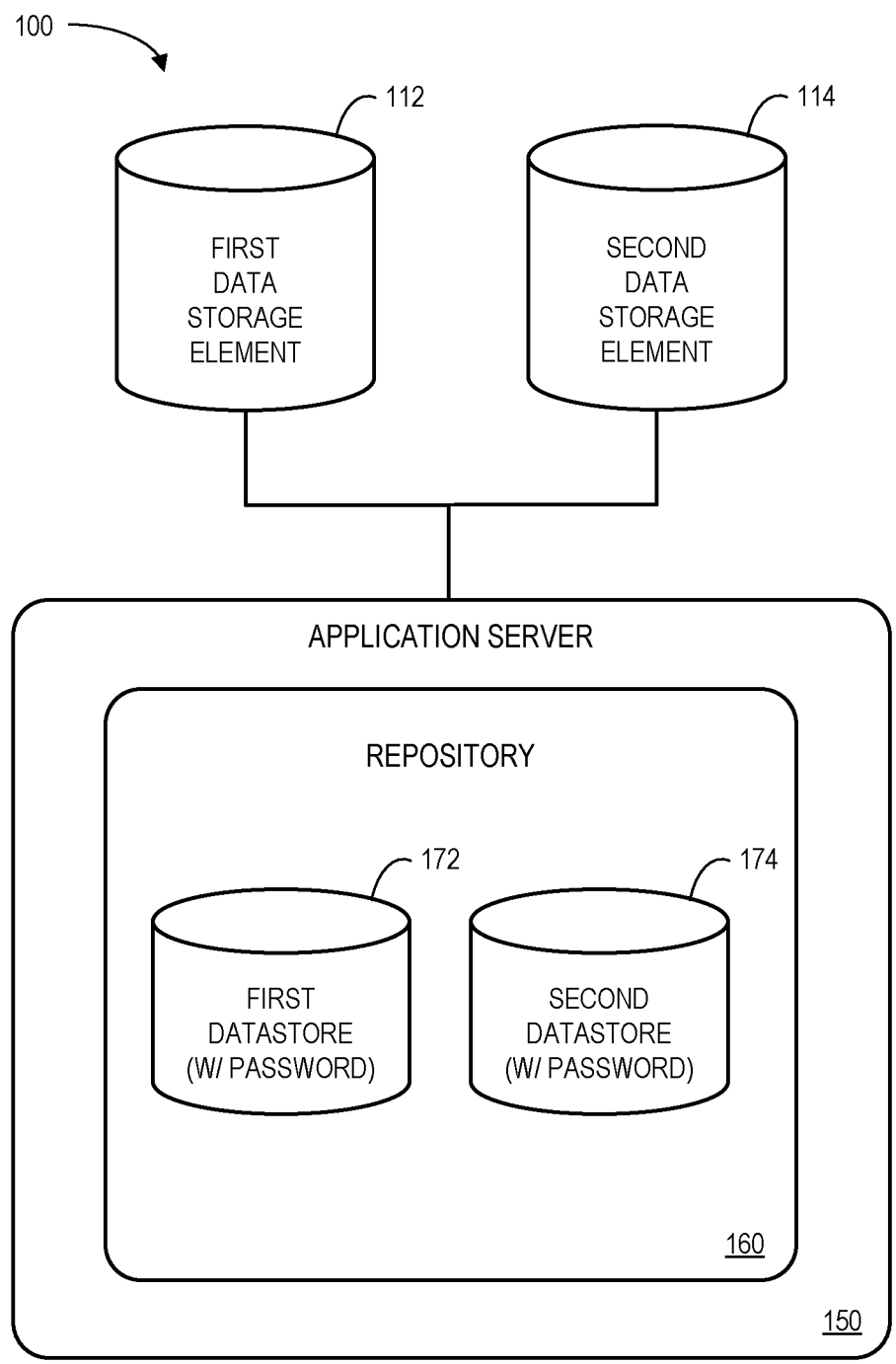
FIG. 1 is a high-level block diagram of a system to facilitate transfers of data associated with data storage elements.

FIG. 1 is a high-level block diagram of a system 100 to facilitate transfers of data associated with data storage elements 112, 114. The system 100 may be associated with, for example, an ETL tool which, like a data service, may be responsible to move data from the first data storage element 112 to the second data storage element 114. Note that the data storage elements may be associated with any data resource, such as a database, a web service, a plain file, etc.

An application server 150 may be provided to facilitate the transfer of data between the data storage elements 112, 114. The application server 150 may include a repository 160 where the ETL tool may store the script of ETL tasks, including ETL logic definition and other associations. The repository 160 may further store a datastore 172, 174 for each of the data storage elements 112, 114 which may represent an abstract layer used by the ETL tool to represent a data source.

Typically, a web site may store end user login passwords in one-way-hash format, and these passwords may be placed in one column of a user profile table and therefore be relatively easy to identify and update. Note, however, that in an ETL cloud solution such as the one illustrated in FIG. 1, the system 100 may store both end user login passwords and data source credentials in the datastores 172, 174 (e.g., to allow access to the data storage elements 112, 114). Moreover, different datastores 172, 174 may store passwords in different ways. By ways of example only, the first datastore 172 might be associated with a database that saves a password as a property of a datastore object while the second datastore 174 saves a password as an element of a property of the datastore object.

For security reasons, these passwords may be encrypted before being saved into the repository 160, and some random key may be used for this encryption. Moreover, a customer associated with a data storage element 112, 114 may be allowed to change password at any time. In order to access data storage element 112 at runtime, the password must be decrypted. Since the password will be decrypted, the system 100 may update a password or associated cipher key, referred to herein as a "rekey" event, after a predetermined period of time or because of a change requested by the customer.

For performance and/or cache reasons, not all pairs of encrypted password and associated keys may be updated with the latest key and, as a result, a password might not be re-encrypted with the latest key. Moreover, multiple cipher keys might co-exist in system 100 in some cases.

Note that the passwords may be scattered at various places in the repository 160. Moreover, for each password storage location, another "key_id" property might be attached for decryption purposes. That is, the actual key may be stored in another, secure place and the key_id can be used as a reference to find that actual key. In many cases, the password may be stored as a part of a Character Large Object ("CLOB") column in a repository 160 database. In some cases, the password may be an element of an eXtensible Mark-up Language ("XML") string, which in turn might be a small part of a CLOB column in the repository 160 database. Further note that the rekey logic will need to understand and handle each and every password storage mechanism in the system 100. For example, the rekey logic may disassemble a CLOB column (which can be very large), update the password value (which is likely less than 1% of the volume of the column), and assemble the whole column back to database. Note that the rekey logic may need to parse a substantially large XML string just to update a 20 character password. As a result, rekey logic can be error-prone and relatively difficult to maintain.

Depending on how difficult it is for the system 100 to update passwords of various datastore configurations, the size of the rekey method can reach thousands of lines of code. Moreover, the code logic is relatively complicated and tends to have substantial possibilities for errors. A typical rekey logic might be implemented as follows:

```
public class RekeyManager{
    public void rekey(int newKeyId){
        for(each datastore in repository){
            if(datastore.type == type_A){
                // set property with new encrypted
```

```
                password (maybe 100 lines of code)
      }else if(datastore.type == type_B){
                         // parse XML and set one element to
new
encrypted password (maybe another 100 lines of code)
         }else{
                             . . . // more datastore types coming
      }
             }
         }
    }
```

Figure 2:
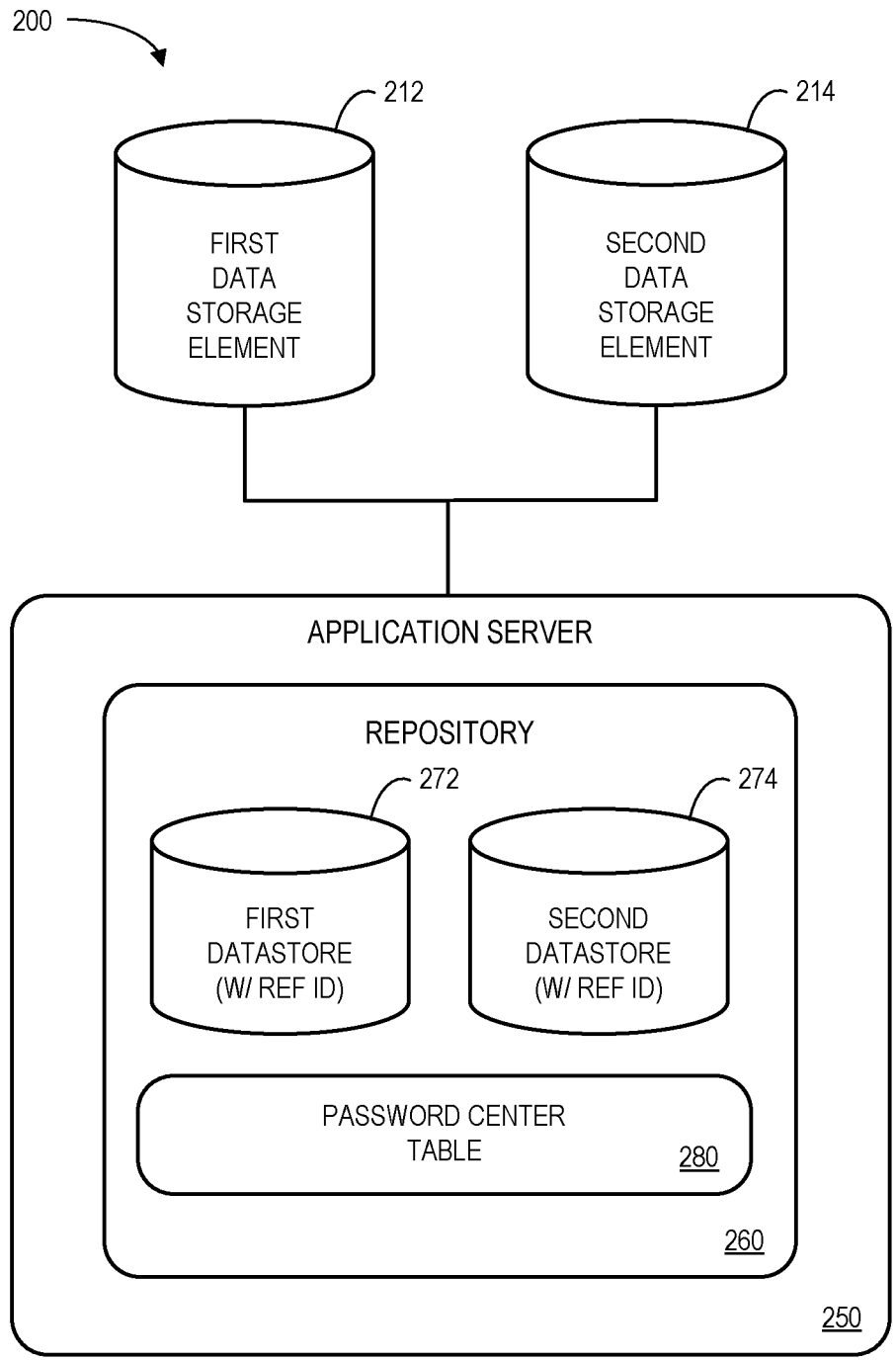
FIG. 2 is a high-level block diagram of a system to facilitate transfers of data associated with data storage elements according to some embodiments.

It may therefore be desirable to provide automated and efficient systems and methods to manage passwords and keys at an application server. FIG. 2 is a high-level block diagram of a system 200 to facilitate transfers of data associated with data storage elements 212, 214 according to some embodiments. As before, the system 200 may be associated with an ETL tool responsible to move data from the first data storage element 212 to the second data storage element 214. Note that the data storage elements may be associated with any data resource, such as a database, a web service, a plain file, etc.

An application server 250 may be provided to facilitate the transfer of data between the data storage elements 212, 214. The application server 250 may include a repository 560 where the ETL tool may store the script of ETL tasks, including ETL logic definition and other associations. The repository 560 may further store a datastore 572, 574 for each of the data storage elements 512, 514.

According to some embodiments, each datastore 572, 574 stores a password reference identifier and the repository 260 further includes a password center table 280. Moreover, the application server 250 may keep the password center table 280 up-to-date and only replace the password reference identifiers in the datastores 272, 274 with the current encrypted passwords at run time.

Note that various components of the system 200 may communicate with one or more database applications over one or more interfaces (e.g., a Structured Query Language ("SQL")-based interface). The database applications may provide, for example, business reporting, inventory control, online shopping, and/or any other suitable functions. The database applications may, in turn, support client applications that may be executed by client devices. Such a client application may simply comprise a Web browser to access and display reports generated by a database application.

The data of the system 200 may be received from disparate hardware and software systems, some of which are not inter-operational with one another. The systems may comprise, for example, a back-end data environment employed in a business or industrial context. The data may be pushed to the system 200 and/or provided in response to queries received therefrom.

Although embodiments are described with respect to the system 200, which may be a "single node" database system, embodiments may also be implemented within one or more nodes of a distributed database. The data stored in the datastores of each node, taken together, may represent a full database, and a database server may process of each node operate to transparently provide the data of the full database to the aforementioned database applications. The system 200 may also or alternatively support multi-tenancy by providing multiple logical database systems which are programmatically isolated from one another.

The system 200 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Moreover, the datastores 272, 274 may also include configuration files defining properties of the system 200 (e.g., a size and physical locations of data volumes, a maximum number of data volumes in a datastore, etc.). Moreover, the datastores 272, 274 may, according to some embodiments, further include system files, database parameters, paths, user information and/or any other suitable information. The datastores 272, 274 may also store a database catalog including metadata describing the database objects that are stored therein.

Figure 3:
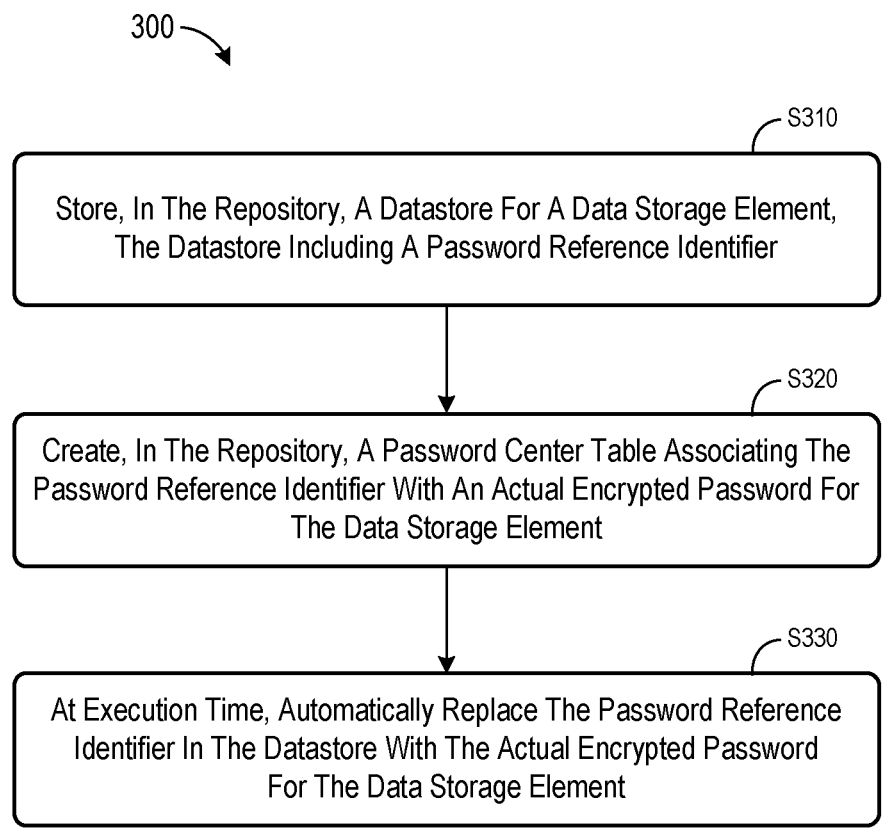
FIG. 3 is a flow diagram of a method in accordance with some embodiments described herein.

FIG. 3 is a flow diagram of a method in accordance with some embodiments described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a datastore may be stored in the repository for a data storage element. The data storage element might be associated with, by way of example only, a database, a cloud implementation, data saved in a local file, data from a File Transfer Protocol ("FTP") server, and/or web services. Moreover, a password reference identifier may be included in each datastore. As used herein, the phrase "password reference identifier" may refer to, for example, a Globally Unique Identifier ("GUID").

At S320, a password center table may be created in the repository to associate the password reference identifier with an actual encrypted password for the data storage element. Note that the actual encrypted password may further be associated with a decryption key (e.g., a pointer to a decryption key). At S330, the application server may, at execution time, automatically replace the password reference identifier in the datastore with the actual encrypted password for the data storage element. For example, a typical centralized password module might be implemented as follows (where "PASSWORD CENTERE" is the password center table of S320):

```
/** SQL part **/
CREATE TABLE PASSWORD_CENTRE(
    GUID VARCHAR(50) NOT NULL,
    ENCRYPTED_PASSWORD VARCHAR(50) NOT NULL,
    KEY_ID INT NOT NULL,
    PRIMARY KEY(GUID)
);
/** JAVA code **/
public class PasswordMode{
    String encryptedPassword;
    int keyId;
    // getters and setters
    . . .
}
public class PasswordManagementModule{
    public String getDecryptedPasswordByGuid(String guid){
        PasswordMode passwordMode =
```

```
        queryDbByGuid(guid);
            return
        decryptPassword(passwordMode.encryptedPassword,
            passwordMode.keyId);
    }
}
```

In this approach, each datastore that needs to store password can store a GUID instead. At execution time, the GUID can be automatically replaced with the real encrypted password from "PASSWORD_CENTRE." Each datastore may be self-contained as follows:

```
public class Datastore{
    public String getExecutionScript( ){
        // read all properties/configurations from DB, parse
        them to build ETL execution script
    // in the mean time, password guid is found out as parsing result
    ...
        script.setPassword(new
    PasswordManagementModule( ).getDecryptedPasswordBy-
    Guid(passwordGuid);
        ...
    }
}
```

Figure 4:
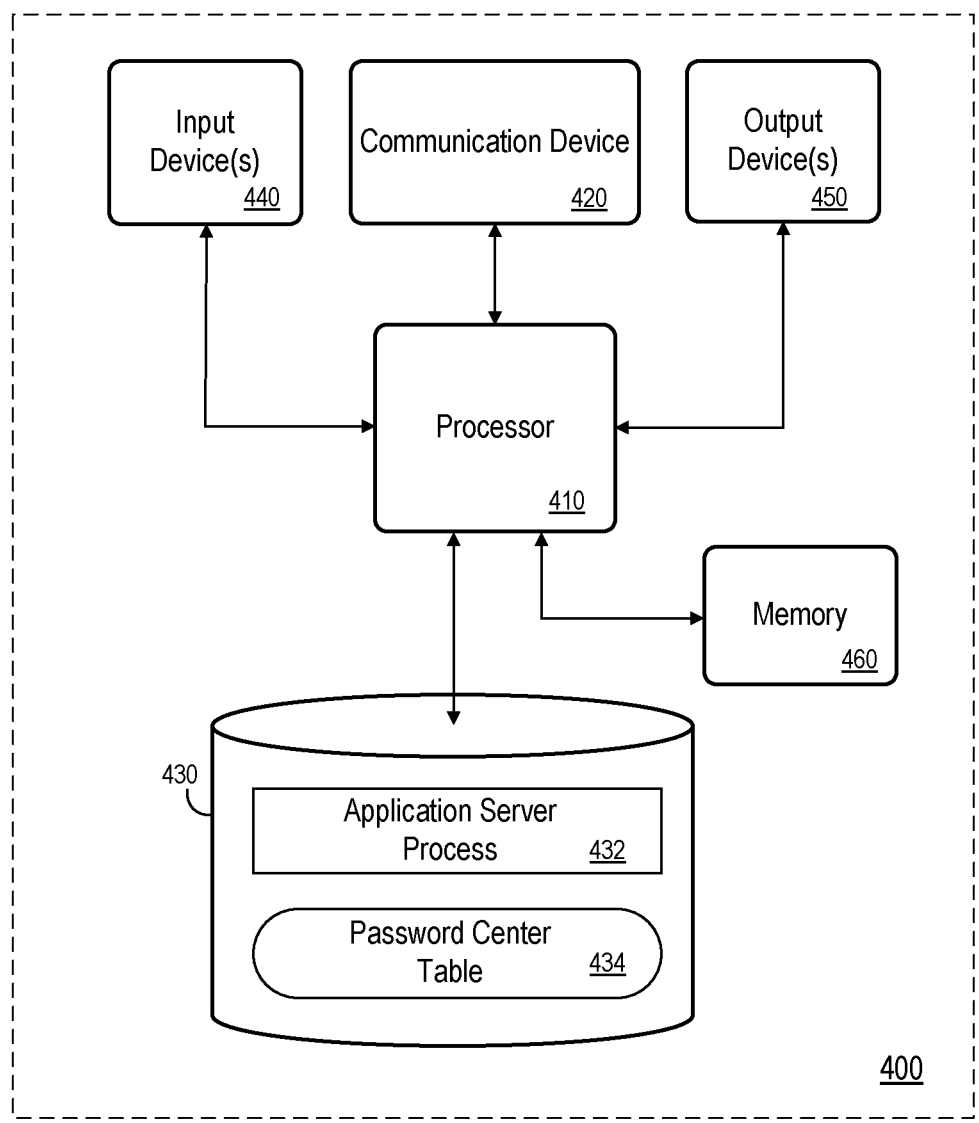
FIG. 4 is a block diagram of a system according to some embodiments.

FIG. 4 is a block diagram of an apparatus 400 according to some embodiments. The apparatus 400 may comprise a general-purpose computing apparatus and may execute program code to perform any of the functions described herein. The apparatus 400 may include other unshown elements according to some embodiments.

The apparatus 400 includes a processor 410 operatively coupled to a communication device 420, a data storage device 430, one or more input devices 440, one or more output devices 450 and a memory 460. The communication device 420 may facilitate communication with external devices, such as a reporting client, or a data storage device. The input device(s) 440 may comprise, for example, a keyboard, a keypad, a computer mouse or other pointing device, a microphone, an infra-red (IR) port, a docking station, and/or a touch screen. The input device(s) 440 may be used, for example, to enter information into apparatus 400. The output device(s) 450 may comprise, for example, a display (e.g., a display screen) a speaker, and/or a printer.

The data storage device 430 may comprise any appropriate persistent storage device, including combinations of magnetic storage devices (e.g., magnetic tape, hard disk drives and flash memory), optical storage devices, Read Only Memory ("ROM") devices, etc., while memory 460 may comprise Random Access Memory ("RAM").

Program code of application server process 432 may be executed by the processor 410 to cause the apparatus 400 to perform any one or more of the processes described herein. Embodiments are not limited to execution of these processes by a single apparatus. The data storage device 430 may also store data and other program code for providing additional functionality and/or which are necessary for operation thereof, such as device drivers, operating system files, etc. For example, the apparatus 400 may have a repository to facilitate a transfer of data between data storage elements. A datastore may be stored in the repository for a data storage element, the datastore including a password reference identifier. The password center table 434 may be created in the repository to associate the password reference identifier with an actual encrypted password for the data storage element.

At execution time, the processor 410 may cause the password reference identifier in the datastore to be automatically replaced with the actual encrypted password for the data storage element.

Referring to FIG. 5, a table is shown that represents the password center table 500 that may be stored at an application server 250 according to some embodiments. The table may include, for example, entries identifying datastores (e.g., that need credentials at execution time to access a data storage element). The table may also define fields 502, 504, 506, 508 for each of the entries. The fields 502, 504, 506, 508 may, according to some embodiments, specify: a datastore identifier 502, a reference identifier 504, an encrypted password 506, and a decryption key link 508. The password center table 500 may be created and updated, for example, based on information electrically received from customers (e.g., with new passwords or decryption keys).

The account identifier 502 may be, for example, a unique alphanumeric code identifying a datastore in the repository. The reference identifier 504 may be, for example, a GUID or any unique alphanumeric code that will be used as a placeholder or encrypted password stand-in for the datastore associated with the datastore identifier 502. The encrypted password 506 may be actual encrypted password that will replace the reference identifier 504 within the datastore at execution time. The decryption key link 508 may comprise a pointer or other information that may help locate the key that can be used to decrypt the encrypted password.

Figure 6:
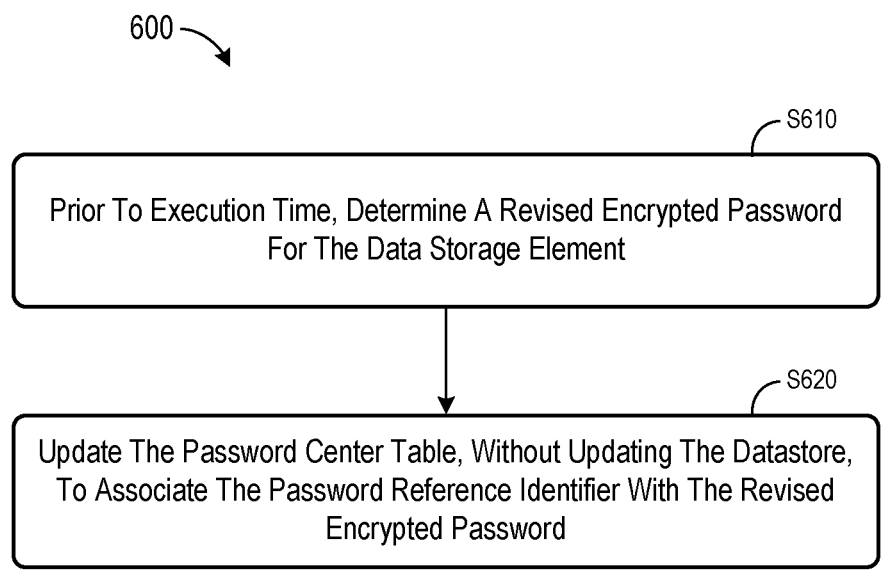
FIG. 6 is a flow diagram of a rekeying method in accordance with some embodiments described herein.

In this way, an application server may process rekeying events in the password center table 500 without needing to change the application stores (until runtime). FIG. 6 is a flow diagram of a rekeying method in accordance with some embodiments described herein. At S610, prior to execution time, a revised encrypted password may be determined for a data storage element. For example, the revision might be made at periodic intervals or at the direction of a client associated with the data storage element. At S620, the password center table may be updated, without updating the datastore, to associate the password reference identifier with the revised encrypted password. Later, at execution time, the correct encrypted password may be retrieved from the password center table and inserted into the datastore (replacing the reference identifier). According to some embodiments, the rekey logic may be implemented as follows:

```
public class RekeyManager{
    public void rekey(int newKeyId){
        PasswordManagementModule passwordManagement-
    Module = new PasswordManagementModule( );
        for (each passwordMode in PASSWORD_CENTRE) {
            String plainPassword = passwordManagement-
    Module.decryptPassword(passwordMode);
            String newPassword =
    passwordManagementModule.encryptPassword
    (plainPassword, newKeyId);
            passwordMode.encryptedPassword = newPass-
    word;
            passwordMode.keyId = newKeyId;
            passwordManagementModule.update
            (passwordMode);
        }
    }
}
```

Thus, embodiments may provide automated an efficient ways of centralized datastore password management. Any end user (e.g., client) change to a datastore password may be made in constant time. The system only needs to update the password center table instead of the expensive (in both CPU and memory costs) processing associated with parsing an entire CLOB column. Moreover, embodiments may process rekey in linear time because the system may only needs to update a row in password center table instead of the error-prone and very expensive (in both CPU and memory costs) parsing of a CLOB column. Note that an amount of overhead may be associated with execution time when the datastore is read out from the repository and parsed to be feed to ETL engine. The overhead may be associated with, for example, a database query to replace the password GUID placeholder in the datastore with an appropriate "password/key_id" pair.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 200 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode ("ATM"), Internet Protocol ("IP"), Hypertext Transfer Protocol ("HTTP") and Wireless Application Protocol ("WAP").

Embodiments described herein are solely for the purpose of illustration. Those in the art will recognize other embodiments may be practiced with modifications and alterations to that described above.

What is claimed is:

1. A method associated with an application server having a repository to facilitate a transfer of data between data storage elements, comprising:
   storing, in the repository via a computer processor, a datastore for a data storage element, the datastore including a password reference identifier comprising a globally unique identifier ("GUID");
   creating, in the repository, a password center table associating the password reference identifier with (i) an encrypted password for the data storage element (ii) a datastore identifier to identify the datastore in the repository and (iii) a pointer to a decryption key for decrypting the encrypted password;
   prior to execution time, determining a revised encrypted password for the data storage element;
   at execution time, automatically replacing, by a hardware computer processor, the password reference identifier in the datastore with the encrypted password and the pointer to the decryption key from the password center table for the data storage element based on the datastore identifier; and
   updating the password center table, without updating the datastore, to associate the password reference identifier with the revised encrypted password.

2. The method of claim 1, wherein at least one of the data storage elements is associated with: (i) a database, (ii) a cloud implementation, (iii) data saved in a local file, (iv) data from a file transfer protocol server, or (v) web services.

3. The method of claim 1, wherein the encrypted password is further associated with a pointer to a decryption key.

4. The method of claim 1, wherein the transfer of data between data storage elements is associated with an extract, transform, load tool and a cloud implementation.

5. The method of claim 4, wherein the datastore comprises an abstract layer used by the extract, transform, load tool to represent the data storage element.

6. A non-transitory computer-readable medium storing program code, the program code executable by a hardware computer processor to perform a method associated with an application server having a repository to facilitate a transfer of data between data storage elements, wherein the method comprises:
   storing, in the repository, a datastore for a data storage element, the datastore including a password reference identifier comprising a globally unique identifier ("GUID");
   creating, in the repository, a password center table associating the password reference identifier with (i) an encrypted password for the data storage element (ii) a datastore identifier to identify the datastore in the repository and (iii) a pointer to a decryption key for decrypting the encrypted password;
   prior to execution time, determining a revised encrypted password for the data storage element;
   at execution time, replacing, via a hardware computer processor, the password reference identifier in the datastore with the encrypted password from the password center table and the pointer to the decryption key for the data storage element based on the datastore; and
   updating the password center table, without updating the datastore, to associate the password reference identifier with the revised encrypted password.

7. The medium of claim 6, wherein at least one of the data storage elements is associated with: (i) a database, (ii) a cloud implementation, (iii) data saved in a local file, (iv) data from a file transfer protocol server, or (v) web services.

8. The medium of claim 6, wherein the encrypted password is further associated with a pointer to a decryption key.

9. The method of claim 1, wherein the transfer of data between data storage elements is associated with an extract, transform, load tool and a cloud implementation.

10. The method of claim 9, wherein the datastore comprises an abstract layer used by the extract, transform, load tool to represent the data storage element.

11. A system, comprising:
    an application server repository to facilitate a transfer of data between data storage elements; and an application server computer processor to: (i) store, in the repository, a datastore for a data storage element, the datastore including a password reference identifier comprising a globally unique identifier ("GUID"), (ii) create, in the repository, a password center table associating the password reference identifier with (i) an encrypted password for the data storage element and (ii) a datastore identifier to identify the datastore in the repository, (iii) prior to execution time, determine a revised encrypted password for the data storage element (iv) at execution time, replace the password reference identifier in the datastore with the encrypted password from the password center table for the data storage element based on the datastore identifier, and (v) update the password center table, without updating the datastore, to associate the password reference identifier with the revised encrypted password.

12. The system of claim 11, wherein at least one of the data storage elements is associated with: (i) a database, (ii) a cloud implementation, (iii) data saved in a local file, (iv) data from a file transfer protocol server, or (v) web services.

13. The system of claim 11, wherein the encrypted password is further associated with a pointer to a decryption key.

14. The system of claim 11, wherein the transfer of data between data storage elements is associated with an extract, transform, load tool and a cloud implementation.

15. The system of claim 14, wherein the datastore comprises an abstract layer used by the extract, transform, load tool to represent the data storage element.

16. The method of claim 1, wherein the password center table further associates the password reference identifier with a pointer to a decryption key for decrypting the encrypted password and at execution time, the password reference identifier in the datastore is replaced with the encrypted password and the pointer to the decryption key.

* * * * *